(12) United States Patent
Sawada et al.

(10) Patent No.: US 10,099,695 B2
(45) Date of Patent: Oct. 16, 2018

(54) HYBRID VEHICLE CONTROL DEVICE (71) Applicant: Nissan Motor Co., Ltd., Yokohama-shi, Kanagawa (JP)

(72) Inventors: Takanobu Sawada, Kanagawa (JP); Kiyotaka Mihara, Kanagawa (JP); Masayuki Tani, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/501,909

(22) PCT Filed: Sep. 9, 2014

(86) PCT No.: PCT/JP2014/073785
§ 371 (c)(1),
(2) Date: Feb. 6, 2017

(87) PCT Pub. No.: WO2016/038680
PCT Pub. Date: Mar. 17, 2016

(65) Prior Publication Data
US 2017/0240174 A1    Aug. 24, 2017

(51) Int. Cl.
*B60W 50/08*    (2012.01)
*B60W 30/182*    (2012.01)
(Continued)

(52) U.S. Cl.
CPC ............. *B60W 30/182* (2013.01); *B60K 6/48* (2013.01); *B60K 6/547* (2013.01); *B60L 11/14* (2013.01);
(Continued)

(58) Field of Classification Search
None
See application file for complete search history.

(56) References Cited

U.S. PATENT DOCUMENTS 5,815,824 A * 9/1998 Saga .................. B60K 6/46
                                                180/65.245
2011/0153127 A1   6/2011 Weslati et al.
(Continued)

FOREIGN PATENT DOCUMENTS

CN    102381203 A    3/2012
CN    103003120 A    3/2013
(Continued)

*Primary Examiner* — Genna M Mott
(74) *Attorney, Agent, or Firm* — Global IP Counselors, LLP (57) ABSTRACT A hybrid vehicle control device is provided that is capable of controlling a drive source according to a travel plan. The hybrid vehicle control device is configured to be mounted in a hybrid vehicle including a drive source having an engine and a motor/generator, and a navigation system that acquires travel environment information of a planned travel route. The control device is configured such that, upon selection of a "travel plan mode", which controls the drive source according to a travel plan set for low fuel travel based on travel environment information acquired from the navigation system in the absence of the selection of an "eco-mode", which controls the drive source to prioritize fuel efficiency over power performance, the selection of the "travel plan mode" is linked with a setting operation for the "eco-mode".

9 Claims, 7 Drawing Sheets (51) Int. Cl.
  *B60K 6/48*   (2007.10)
  *B60K 6/547*  (2007.10)
  *B60L 11/14*  (2006.01)
  *B60W 10/00*  (2006.01)
  *B60W 20/00*  (2016.01)
  *B60W 20/12*  (2016.01)
  *B60W 20/15*  (2016.01)
  *B60W 10/06*  (2006.01)
  *B60W 10/08*  (2006.01)
  *G01C 21/34*  (2006.01)
  *G01C 21/36*  (2006.01)
  *B60W 50/14*  (2012.01)
  *B60W 50/00*  (2006.01)
  *B60W 50/12*  (2012.01)

(52) U.S. Cl.
  CPC ............ *B60W 10/00* (2013.01); *B60W 10/06* (2013.01); *B60W 10/08* (2013.01); *B60W 20/00* (2013.01); *B60W 20/12* (2016.01); *B60W 20/15* (2016.01); *B60W 50/082* (2013.01); *B60W 50/14* (2013.01); *G01C 21/3469* (2013.01); *G01C 21/3691* (2013.01); B60W 50/0097 (2013.01); B60W 50/12 (2013.01); B60W 2540/04 (2013.01); B60W 2550/00 (2013.01); B60W 2550/402 (2013.01); B60W 2710/06 (2013.01); B60W 2710/08 (2013.01); B60Y 2200/92 (2013.01); *B60Y 2300/182* (2013.01); *Y02T 10/6221* (2013.01); *Y02T 10/7077* (2013.01); *Y02T 10/7241* (2013.01); *Y02T 10/84* (2013.01); *Y02T 90/16* (2013.01); *Y10S 903/93* (2013.01)

(56) References Cited

U.S. PATENT DOCUMENTS

| 2011/0160992 | A1* | 6/2011 | Crombez | B60W 30/182 701/123 |
| 2012/0053772 | A1* | 3/2012 | Lu | B60L 15/2045 701/22 |
| 2012/0116626 | A1 | 5/2012 | Perkins et al. | |
| 2012/0232730 | A1 | 9/2012 | Sujan et al. | |
| 2014/0214267 | A1* | 7/2014 | Sellschopp | G06F 17/00 701/34.2 |

FOREIGN PATENT DOCUMENTS

| JP | 8-240435 A | 9/1996 |
| JP | 2001-183150 A | 7/2001 |
| JP | 2010-132241 A | 6/2010 |
| JP | 2011-25778 A | 2/2011 |
| JP | 2011-184013 A | 9/2011 |
| JP | 4905516 B2 | 1/2012 |
| JP | 2012-95519 A | 5/2012 |
| RU | 2 503 559 C2 | 1/2014 |
| WO | 94/16304 A1 | 7/1994 |

\* cited by examiner

HYBRID VEHICLE CONTROL DEVICE

CROSS-REFERENCE TO RELATED APPLICATIONS

This application is a U.S. National stage application of International Application No. PCT/JP2014/073785, filed Sep. 9, 2014.

BACKGROUND

Field of the Invention

The present invention relates to a hybrid vehicle control device that controls a drive source according to a driving mode of a hybrid vehicle having a drive source comprising an engine and a motor.

Background Information

Conventionally, a hybrid vehicle control device is known that is mounted on a hybrid vehicle including a drive source having an engine and a motor, and a navigation system that acquires travel environment information of a planned travel route, wherein the hybrid vehicle control device sets an accelerator operation schedule to be in a low fuel travel when on a planned travel route, and displays a recommended accelerator operation based on the set accelerator operation schedule (for example refer to Japanese Patent No. 4905516).

SUMMARY

However, the conventional hybrid vehicle control device only displays a recommended accelerator operation; therefore, while a driver can be aware of the recommended accelerator operation, there are cases in which the driver cannot carry out the recommended accelerator operation depending on the road conditions, weather conditions, etc. As a result, there is the problem that the accelerator operation will not be in accordance with the accelerator operation schedule, and that a presumed drive source control cannot be carried out.

In view of the problem described above, an object of the present invention is to provide a hybrid vehicle control device that is able control the drive source in accordance with a travel plan.

In order to achieve the object described above, the hybrid vehicle control device of the present invention is mounted in a hybrid vehicle having a drive source that includes an engine and a motor, and a navigation system that acquires travel environment information on a planned travel route, and comprises a drive source controller that carries out control of the drive source in accordance with a driving mode of the hybrid vehicle. The hybrid vehicle comprises, as driving modes, a travel plan mode that controls the drive source in accordance with a travel plan that is set based on the travel environment information acquired from the navigation system, and an eco-mode that controls the drive source that prioritizes fuel efficiency over power performance. In addition, the drive source controller is configured to associate a selection of the travel plan mode with a setting operation of the eco-mode, upon the travel plan mode being selected in a state in which the eco-mode is not selected.

Here, even if a travel plan is set based on travel environment information, there are cases in which the actual drive source control is different from what is assumed, depending on how the driver drives. In contrast, since the selection of the travel plan mode is associated with the setting operation of the eco-mode in the hybrid vehicle control device of the present invention, if the eco-mode is set at the time of selecting the travel plan mode, it is possible to suppress the requested drive force in order to reduce variation in the driving of the driver. It is thereby possible to suppress an unexpected engine start caused by the driving of the driver, and to control the drive source in accordance with the travel plan.

DETAILED DESCRIPTION OF THE EMBODIMENTS

An embodiment for implementing the hybrid vehicle control device of the present invention is explained below based on the first embodiment and the second embodiment illustrated in the drawings.

First Embodiment

First, the "Overall system configuration of a hybrid vehicle," the "Configuration of the vehicle control system," and the "Configuration of the driving mode setting process" will be separately described regarding the configuration of the hybrid vehicle control device of the first embodiment.

Overall System Configuration of a Hybrid Vehicle

Figure 1:
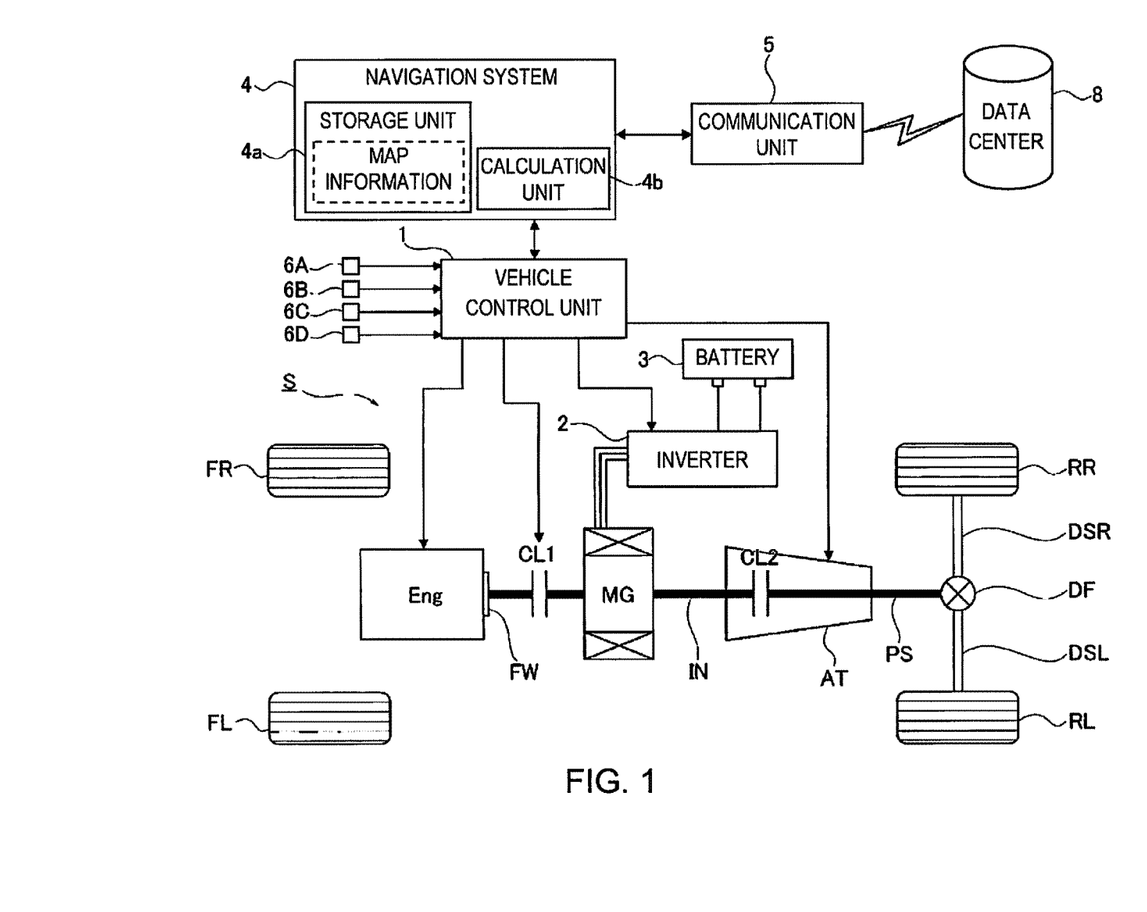
FIG. 1 is an overall system view illustrating a hybrid vehicle to which is applied the control device of a first embodiment.

FIG. 1 is an overall system view illustrating a hybrid vehicle to which is applied the hybrid vehicle control device of the first embodiment. The overall system configuration of the hybrid vehicle of the first embodiment will be described below, based on FIG. 1.

The hybrid vehicle S according to the first embodiment is a rear wheel drive FR hybrid vehicle (one example of a hybrid vehicle). The drive system of the hybrid vehicle S comprises an engine Eng, a first clutch CL1, a motor/generator MG, a second clutch CL2, an automatic transmission AT, a transmission input shaft IN, a propeller shaft PS, a differential DF, a left drive shaft DSL, a right drive shaft DSR, a left rear wheel RL (drive wheel), and a right rear wheel RR (drive wheel), as illustrated in FIG. 1. FL is the left front wheel and FR is the right front wheel.

The engine Eng is a gasoline engine or a diesel engine, and a drive source of the hybrid vehicle S. In the engine Eng, engine start control, engine stop control, valve opening control of the throttle valve, fuel-cutoff control, and the like are carried out based on engine control commands from a vehicle control unit 1. A first clutch CL1 is connected to the engine output shaft via a flywheel FW.

The first clutch CL1 is a clutch that is interposed between the engine Eng and the motor/generator MG, in which engagement/slip engagement/disengagement are controlled by a first clutch control hydraulic pressure produced by a hydraulic unit, which is not shown, based on a control command from the vehicle control unit 1. One example of this first clutch CL1 to be used is a normally closed dry single-plate clutch, in which the steps from full engagement-→slip engagement→full disengagement, are controlled by a stroke control that uses a hydraulic actuator having a piston, and which maintains full engagement by a biasing force of a diaphragm spring. This first clutch CL1 acts as a mode switching means that switches between an electric vehicle mode, having only the motor/generator MG as the travel drive source, and a hybrid vehicle mode, having both the engine Eng and the motor/generator MG as the travel drive sources.

The motor/generator MG is a synchronous motor/generator, in which a permanent magnet is embedded in the rotor and a stator coil is wound on the stator, and which is a drive source of the hybrid vehicle S. This motor/generator MG is controlled by applying three-phase AC that is produced by an inverter 2, based on a control command from the vehicle control unit 1. The motor/generator MG may be operated as an electric motor that is rotationally driven by receiving a power supply from a battery 3 to start the engine Eng or to drive the left and right rear wheels RL and RR (this operating state is hereinafter referred to as "powering"), or may function as an electric generator that generates an electromotive force at both ends of the stator coil and charges the battery 3, when the rotor receives rotational energy from the engine Eng or the left and right rear wheels RL and RR (this operating state is hereinafter referred to as "regeneration"). The rotor of the motor/generator MG is connected to the transmission input shaft IN of the automatic transmission AT.

The second clutch CL2 is interposed between the motor/generator MG, and the left and right rear wheels RL and RR, in which engagement/slip engagement/disengagement are controlled by a second clutch control hydraulic pressure produced by a hydraulic unit, which is not shown, based on a control command from the vehicle control unit 1. Examples of the second clutch CL2 to be used include a normally opened wet multi-plate clutch, or a wet multi-plate brake that can continuously control the oil flow amount and the hydraulic pressure with a proportional solenoid.

The automatic transmission AT is a stepped transmission that is interposed between the motor/generator MG, and the left and right rear wheels RL and RR, and in which, for example, stepped gear stages of seven forward gears/one reverse gear are automatically switched in accordance with the vehicle speed, accelerator position opening amount, or the like. A propeller shaft PS is coupled to the transmission output shaft of the automatic transmission AT. Then, the propeller shaft PS is connected to the left and right rear wheels RL and RR via the differential DF, the left drive shaft DSL, and the right drive shaft DSR. In the first embodiment of a plurality of frictional engagement elements that are engaged at each gear stage of the automatic transmission AT, an optimum frictional engagement element (a clutch or a brake) that is disposed in a torque transmission path and that conforms to a predetermined condition is selected to be the second clutch CL2. That is, the second clutch CL2 is not newly added as a dedicated clutch that is independent of the automatic transmission AT.

The hybrid vehicle S comprises an electric vehicle mode (hereinafter referred to as "EV mode") and a hybrid vehicle mode (hereinafter referred to as "HEV mode"), as traveling modes according to differences in the driving mode, that is, differences in the travel drive source.

The "EV mode" is a mode in which the first clutch CL1 is released and in which traveling is carried out by only the driving force of the motor/generator MG, with the engine Eng stopped. The "EV mode" comprises a motor traveling mode and a regenerative traveling mode. The "EV mode" is selected when the required drive torque is low and when a remaining charge amount of the battery 3 (hereinafter referred to as "battery SOC (abbreviation for State of Charge)") is secure.

The "HEV mode" is a mode in which the first clutch CL1 is engaged and in which traveling is carried out by the drive force of both the engine Eng and the motor/generator MG. The "HEV mode" comprises a motor assist traveling mode, a power generation traveling mode, and an engine traveling mode. The "HEV mode" is selected when the required drive torque is high, or when the battery SOC is lacking.

Furthermore, the FR hybrid vehicle S comprises a "normal mode" and a "travel plan mode" as driving modes according to differences in the control method of the drive source. Furthermore, an "eco-mode", a "sports mode", and a "normal mode" are provided as driving modes according to differences in the control method of the drive source when in the "normal mode" and the "travel plan mode."

The "normal mode" is a mode in which a traveling mode is selected by searching a preset traveling mode setting map (not shown) based on a driver's requested drive force, and the drive source is controlled according to the selected traveling mode at any given time. The setting of the "normal mode" is automatically carried out when the "travel plan mode" is not set.

The "travel plan mode" is a mode in which a travel plan (planned travel mode) is set for low fuel travel based on travel environment information on a planned travel route that is set by the navigation system 4, to be described later, and the drive source is controlled according to the travel plan. That is, in the "travel plan mode," the planned travel route is first divided into a plurality of sections and the driver's requested drive force is assumed for each section based on the travel environment information. Then, the traveling mode in each section is set according to the assumed requested drive force, to configure the travel plan (planned travel mode). Then, the drive source, such as the engine Eng and the motor/generator MG, is controlled to be in low fuel travel when in a traveling mode that is set by the travel plan. In the "travel plan mode," when a requested drive force that is different from what is assumed is generated due to the manner in which the driver drives, and there is no other choice but to select a traveling mode that is different from the travel plan, the traveling mode that is selected based on the actually generated requested drive force of the driver is given priority. In addition, the setting of the "travel plan mode" is carried out by the driver manually turning ON a setting button, which is not shown.

The "eco-mode" is a mode that prioritizes fuel efficiency over power performance, and in which the drive source is controlled so as to suppress the fuel consumption rate more compared to the "sports mode" and the "normal mode." That is, the target drive force is set to a smaller value than the "sports mode" or the "normal mode" with respect to the same accelerator operation amount. The setting of the "eco-mode" is carried out by the driver manually turning ON a setting button, which is not shown, as well as being automatically carried out in conjunction with a selection of the "travel plan mode", as described later.

The "sports mode" is a mode that prioritizes power performance over fuel efficiency, in which the target drive force is set to a larger value with respect to the same accelerator operation amount compared to the "normal mode" and in which the drive source is controlled so as to realize the target drive force having a relatively large value. The setting of the "sports mode" is carried out by the driver manually turning ON a setting button, which is not shown.

The "normal mode" is a mode in which a predetermined target drive force is set in advance with respect to the accelerator operation amount, and in which the drive source is controlled so as to realize the target drive force. The setting of the "normal mode" is automatically carried out when the "eco-mode" or the "sports mode" is not set.

Configuration of the Vehicle Control System

The vehicle control system of the FR hybrid vehicle S in the first embodiment comprises a vehicle control unit 1, an inverter 2, a battery 3, a navigation system 4, and a communication unit 5, as illustrated in FIG. 1.

The vehicle control unit 1 (drive source controller) is provided with a micro-computer, peripheral parts thereof, and various actuators, etc., and a vehicle speed information from the vehicle speed sensor 6A, an accelerator position opening amount information from the accelerator position opening amount sensor 6B, a battery SOC information from an SOC monitoring unit 6C, which constantly monitors the battery SOC, climate information from a climate sensor 6D, which comprises a thermometer, a hygrometer, etc., and detects the climate state such as temperature, humidity, rain, snow, wind, etc., and travel environment information on a planned travel route from the navigation system 4, are input thereto. The vehicle control unit then controls the rotational speed and the output torque of the engine Eng, the engagement/slip engagement/disengagement of the first clutch CL1 and the second clutch CL2, the rotational speed and the output torque of the motor/generator MG, and the gear shift stage of the automatic transmission AT. In addition, the vehicle control unit 1 executes a driving mode setting process, to be described later. Furthermore, when the "travel plan mode" is selected as the driving mode, a travel plan on a planned travel route is set for low fuel travel based on the travel environment information that is input from the navigation system 4, and the drive source such as the engine Eng and the motor/generator MG is controlled according to this travel plan.

The navigation system 4 comprises a storage unit 4a, a calculation unit 4b, and a display (not shown). The storage unit 4a stores road information, such as the road radius of curvature, gradients, intersections, traffic signals, railway crossings, crosswalks, speed limits, and toll booths, etc., and map information including road attribute information (expressways, arterial highways, general roads, residential areas, etc.). The calculation unit 4b receives signals from satellites and detects the absolute location of the hybrid vehicle S on earth. Then, reference is made to a map stored in the storage unit 4a to identify the location where the hybrid vehicle S is present (current position), and the planned travel route from this current position to the destination is set. This planned travel route, as well as the road information and the road attribute information (travel environment information) on the route are input to the vehicle control unit 1. In addition, the display, which is not shown, is provided in the cabin interior, to be visible by the driver.

The communication unit 5 is connected to the navigation system 4 and carries out a wireless communication (telematics communication) with a data center 8 having traffic information, traffic data statistics, traffic jam information, etc., via a communication network such as a wireless base station and the interne, which are not shown. This "communication" is bidirectional, with which it is possible to transmit information from the navigation system 4 to the data center 8 via the communication unit 5, and inputting information received from the data center 8 via the communication unit 5 to the navigation system 4. Various devices can be employed as the communication unit 5, including cellular phones, DSRC, and wireless LAN.

Configuration of the Driving Mode Setting Process

Figure 2:
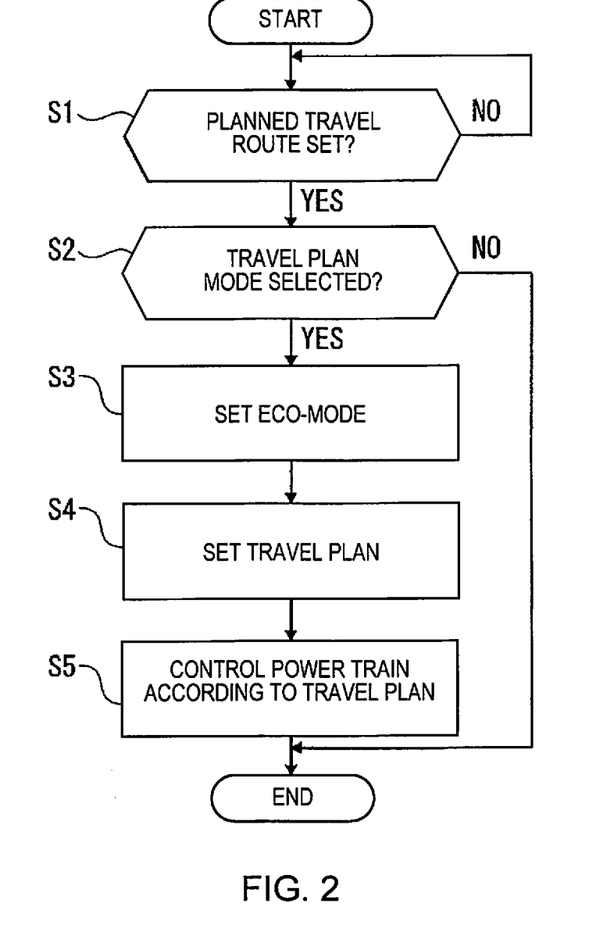
FIG. 2 is a flowchart illustrating the flow of a driving mode setting process that'is executed by the vehicle control unit of the first embodiment.

FIG. 2 is a flowchart illustrating the flow of a driving mode setting process that is executed by the vehicle control unit of the first embodiment. Each step of the flowchart in FIG. 2, representing the content of the driving mode setting process, is described below.

In Step S1, it is determined whether or not the driver has input the destination and a planned travel route from the current position to the destination has been set by the navigation system 4. The input of the destination includes not only a driver's operation, but also cases in which the destination is inferred by the navigation system 4 from the past travel history, or the like. If YES (planned travel route set), the process proceeds to Step S2. If NO (planned travel route not set), the process repeats Step S1.

In Step S2, following the determination that the planned travel route is set in Step S1, it is determined whether or not the "travel plan mode" is selected in a state in which the eco-mode is not selected. If YES (eco-mode=OFF, travel plan mode=ON), the process proceeds to Step S3. If NO (eco-mode=ON or travel plan mode=OFF), the process proceeds to END.

In Step S3, following the determination that eco-mode=OFF and travel plan mode=ON in Step S2, the "eco-mode" is automatically set, and the process proceeds to Step S4. That is, when the "travel plan mode" is selected in Step S2, the selection of this "travel plan mode" is associated to the setting operation of the "eco-mode." Here, since the "travel plan mode" is already selected in Step S2, the "eco-mode" is selected in parallel as the driving mode.

In Step S4, following the setting of the eco-mode in Step S3, a travel plan on the planned travel mode is set, and the process proceeds to Step S5. Here, the setting of the travel plan assumes the driver's requested drive force based on the travel environment information for each section after dividing the planned travel route into a plurality of sections. Then, the traveling mode for each section is set according to the assumed requested drive force. The "travel environment information" that is used when setting the travel plan includes road information and road attribute information from the navigation system 4, vehicle speed information from the vehicle speed sensor 6A, accelerator position opening amount information from the accelerator position opening amount sensor 6B, battery SOC information from the SOC monitoring unit 6C, climate information from the climate sensor 6D, as well as ambient information obtained by cameras and radars, which are not shown.

In Step S5, following the setting of the travel plan in Step S4, a control of the power train, including the drive source comprising the engine Eng and the motor/generator MG, is carried out according to the set travel plan, and the process proceeds to END. Here, since the "eco-mode" is set, the drive source is controlled so as to suppress the fuel consumption rate more compared to the "sports mode" and the "normal mode." That is, a relatively small target drive force is set with respect to the accelerator operation amount by the driver, and, for example, the vehicle speed is suppressed.

Next, the actions are described. First, the "Travel plan setting action and problems thereof in the hybrid vehicle control device of the first comparative example" will be described, followed by a description of the travel plan setting action of the hybrid vehicle control device according to the first embodiment.

Figure 3:
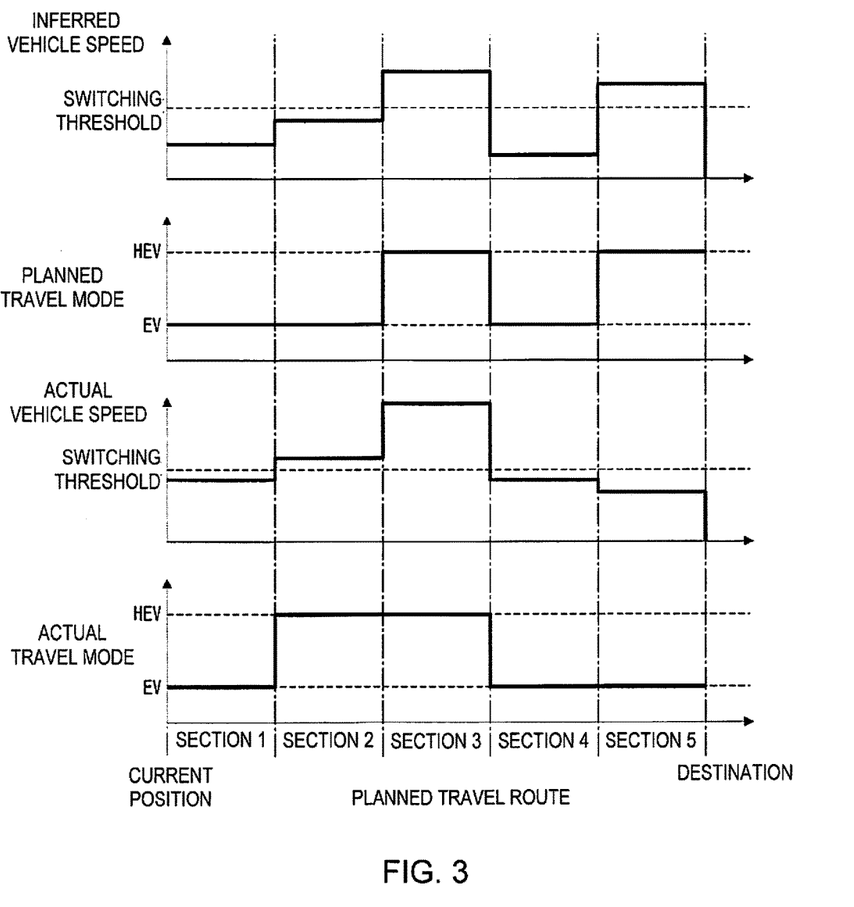
FIG. 3 is a time chart illustrating the characteristics of each of the inferred vehicle speed/planned travel mode/actual vehicle speed/actual travel mode when setting the "travel plan mode" in the control device of a first comparative example.

Travel Plan Setting Action and Problems Thereof in the Hybrid Vehicle Control Device of the First Comparative Example FIG. 3 is a time chart illustrating the characteristics of each of the inferred vehicle speed/planned travel mode/actual vehicle speed/actual travel mode, when setting the "travel plan mode" in the control device of the first comparative example. The travel plan setting action and problems thereof in the hybrid vehicle control device of the first comparative example will be described below, based on FIG. 3.

In the hybrid vehicle control device according to the first comparative example, when the "travel plan mode" is selected as the driving mode, the driving mode that is already set from among the "eco-mode," "sports mode," and the "normal mode," is continued. For example, if the "travel plan mode" is selected in a state in which the "eco-mode" is not set and the "normal mode" is set, a travel plan is set while continuing the "normal mode," and the drive source is controlled while continuing the "normal mode" according to the set travel plan.

That is, first, the planned travel route is divided into a plurality of sections (here, section 1-section 5), as illustrated in FIG. 3. Then, the travel environment information is acquired for each section, and the inferred vehicle speed is calculated based on this acquired travel environment information. The inferred vehicle speed shall be the average vehicle speed of each section.

Then, a travel plan (planned travel mode) is set based on this inferred vehicle speed; here, the planned travel mode is set to the "EV mode" if the inferred vehicle speed is smaller than a switching threshold that is set in advance, and the planned travel mode is set to the "HEV mode" if the inferred vehicle speed is greater than or equal to the switching threshold. The planned travel mode thereby becomes the "EV mode" in section 1, section 2, and section 4, and becomes the "HEV mode" in section 3 and section 5. That is, it is possible to achieve a low fuel travel by traveling in the "EV mode," having only the motor/generator MG as the travel drive source, in section 1, section 2, and section 4, and by traveling in the "HEV mode," having the engine Eng and the motor/generator MG as travel drive sources, in section 3 and section 5. The planned travel mode may be determined and set, based not only on the inferred vehicle speed, but also on gradient information, the inferred number of times of start/stop inferred from traffic jams and the number of traffic signals, and the inferred efficiency of the power train such as the presence/absence of an acceleration scene.

In contrast, the vehicle speed when the driver is actually traveling is indicated by the actual vehicle speed. Here, the actual vehicle speed exceeded the inferred vehicle speed in sections 1 to 4, and the actual vehicle speed fell below the inferred vehicle speed in section 5. Since the "normal mode" is set at this time, the drive source is controlled so as to realize a predetermined target drive force that is set in advance with respect to the driver's accelerator operation amount. In other words, the driver's accelerator operation is directly reflected on the actual vehicle speed. When in this "travel plan mode," the traveling mode that is selected based on the driver's requested drive force that is actually generated is given priority over the traveling mode that is set in the travel plan. Accordingly, in section 1, section 4, and section 5, in which the actual vehicle speed falls below the switching threshold, the actual travel mode is set to the "EV mode." On the other hand, in section 2 and section 3, in which the actual vehicle speed exceeds the switching threshold, the actual travel mode is set to the "HEV mode."

As a result, in section 2 and section 5, the drive source is controlled by a traveling mode that is different from the travel plan (planned travel mode). Consequently, a problem arises in which a low fuel travel cannot be carried out, and the fuel efficiency deteriorates.

Travel Plan Setting Action

Figure 4:
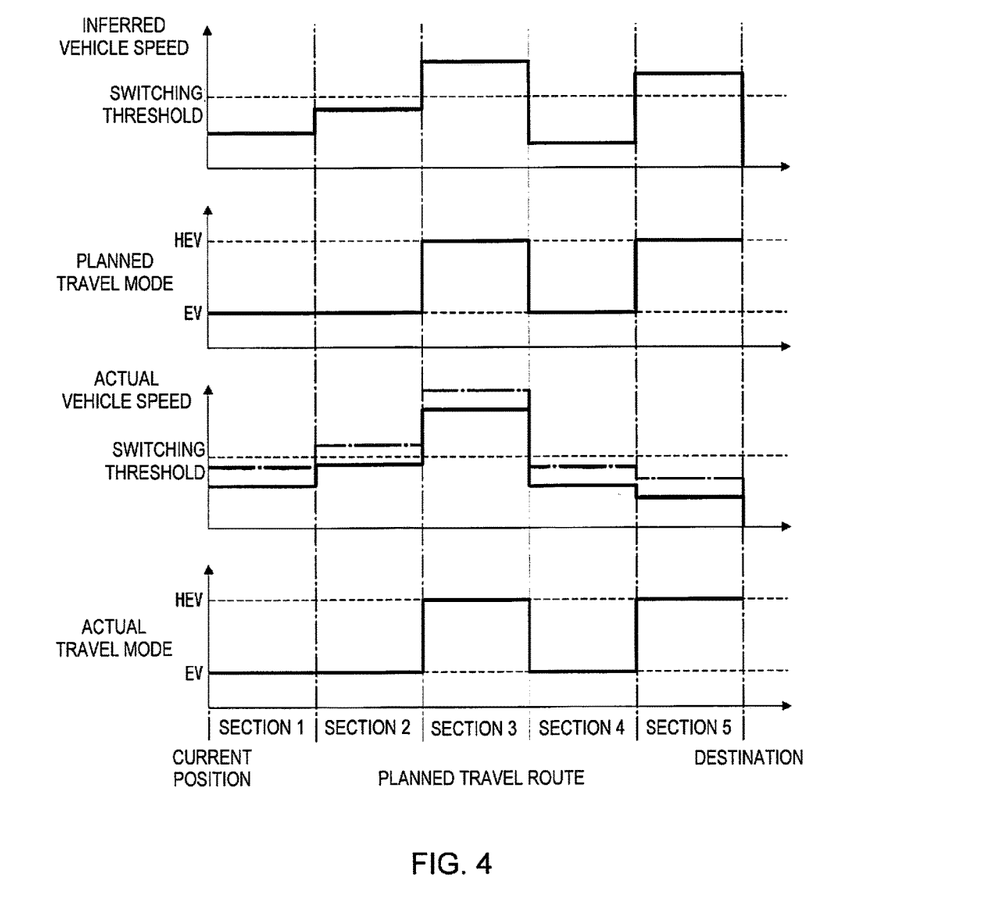
FIG. 4 is a time chart illustrating the characteristics of each of the inferred vehicle speed/planned travel mode/actual vehicle speed/actual vehicle speed mode, when setting the "travel plan mode" in the control device of the first embodiment.

FIG. 4 is a time chart illustrating the characteristics of each of the inferred vehicle speed/planned travel mode/actual vehicle speed/actual travel mode, when setting the "travel plan mode" in the control device of the first embodiment. The travel plan setting action in the control device of the first embodiment will be described below, based on FIG. 4.

In the hybrid vehicle control device according to the first embodiment, when destination information is input to the navigation system 4 by an operation of the driver, a planned travel route from the current position to the destination is set based on map information, etc., that is stored in the navigation system 4. It is thereby determined YES in Step S1 in the flowchart illustrated in FIG. 2 and the process proceeds to Step S2; then, if the "travel plan mode" is selected as the driving mode, the process proceeds from Step S2→Step S3, and the "eco-mode" is automatically selected. The "travel plan mode" and the "eco-mode" will thereby be set in parallel as the driving modes.

If the "eco-mode" is set, the process proceeds to Step S4 and a travel plan is set. Here, in the same manner as the control device of the first comparative example, the planned travel route is first divided into a plurality of sections (here, section 1-section 5). Then, the travel environment information, such as road information and vehicle speed information, is acquired for each section from the navigation system 4 and various sensors, and the inferred vehicle speed is calculated based on this acquired travel environment information. It is assumed that reducing variation in the driver's driving is possible by the "eco-mode" being set at this time, and it becomes easy to infer the accuracy of the travel environment information, such as the vehicle speed, acceleration and deceleration, electric power consumption, and fuel consumption on the planned travel mode.

Then, the travel plan (planned travel mode) is set based in the inferred vehicle speed. Here, the planned travel mode is set to the "EV mode" in section 1, section 2, and section 4 since the inferred vehicle speed is smaller than the switching threshold, and the planned travel mode is set to the "HEV mode" in section 3 and section 5 since the inferred vehicle speed is greater than or equal to the switching threshold.

It is thereby possible to achieve a low fuel travel by traveling in the "EV mode" in section 1, section 2, and section 4, and by traveling in the "HEV mode" in section 3 and section 5. Then, when the travel plan is set, the process proceeds to Step S5, and a control of the power train, including the drive source, is carried out according to the travel plan.

In contrast, the vehicle speed when the driver is actually traveling is indicated by the actual vehicle speed. Here, in the first embodiment, the selection of this "travel plan mode" when the "travel plan mode" is selected, is associated to the setting operation of the "eco-mode." Accordingly, even if the accelerator operation amount is the same, the vehicle speed is reduced compared to the "normal mode" by being set to the "eco-mode." That is, compared to the actual vehicle speed in the "normal mode" indicated by the dashed-dotted line in FIG. 4 for comparison, in the first embodiment, the actual vehicle speed becomes a lower value even if, for example, the accelerator operation amount is the same. As a result, the switching threshold that determines the traveling mode changes (rises).

Accordingly, in section 2, although a traveling mode that is different from the travel plan will be set in the first comparative example, it is possible to lower the actual vehicle speed in the first embodiment. Therefore, it is possible to set the actual travel mode to the "EV mode," which is the same as the planned travel mode. It is thereby possible to suppress an unexpected engine start caused by the driving of the driver, and to control the drive source in accordance with the travel plan for achieving a low fuel travel.

In addition, in section 5, the actual vehicle speed is lowered by setting the "eco-mode," and this actual vehicle speed falls below the switching threshold. However, by traveling in the "EV mode" in section 2, it is possible to consume the battery SOC as expected. Therefore, it is possible to set the actual travel mode to the "HEV mode," which is the same as the planned travel mode. That is, by carrying out a control of the drive source in accordance with the travel plan until reaching section 5, it is possible to control the drive source in accordance with the travel plan, if necessary, regardless of the actual vehicle speed. In the case of the first comparative example, due to the "HEV mode" being set in section 2, the battery SOC becomes more excessive than assumed when traveling in section 5. Consequently, it is difficult to set the "HEV mode" in section 5. That is, in the control device of the first comparative example, with the occurrence of an unexpected engine start, it becomes impossible to carry out a control of the drive source in accordance with the travel plan in section 5, due to the effects of the battery SOC, etc.

In this manner, by associating the selection of the "travel plan mode" with the setting operation of the "eco-mode" when the "travel plan mode" is selected in a state in which the "eco-mode" is not selected as the driving mode, it is possible to suppress the driver's requested drive force in order to reduce variation in the driving of the driver. Accordingly, it is possible to suppress an unexpected engine start caused by the driving of the driver, and to control the drive source in accordance with the travel plan. Then, by carrying out a control of the drive source in accordance with the travel plan, a low fuel travel becomes possible to thereby improve the fuel efficiency.

In addition, in the first embodiment, when the selection of the "travel plan mode" is associated with the setting operation of the "eco-mode," the "eco-mode" is automatically set when the "travel plan mode" is selected. Accordingly, a manual setting operation of the "eco-mode" by the driver is unnecessary, and it is possible to reliably set the "eco-mode" when selecting the "travel plan mode." As a result, it is possible to suppress an unexpected engine start caused by the driving of the driver, and to control the drive source in accordance with the travel plan.

Next, the effects are described. The effects listed below can be obtained with the hybrid vehicle control device according to the first embodiment.

(1) A hybrid vehicle control device, mounted in a hybrid vehicle S including a drive source having an engine Eng and a motor (motor/generator MG), and a navigation system 4 that acquires travel environment information of a planned travel route, comprising a drive source controller (vehicle control unit 1) that carries out control of the drive source (engine Eng, motor/generator MG) in accordance with a driving mode of the hybrid vehicle S, wherein the hybrid vehicle S comprises, as driving modes, a "travel plan mode" that controls the drive source (engine Eng, motor/generator MG) in accordance with a travel plan that is set for low fuel travel based on the travel environment information acquired from the navigation system 4, and an "eco-mode" that controls the drive source (engine Eng, motor/generator MG) prioritizing fuel efficiency over power performance, the drive source controller (vehicle control unit 1) being configured such that, upon selection of the "travel plan mode" in the absence of the selection of the "eco-mode", the selection of the "travel plan mode" is associated with a setting operation of the "eco-mode". It is thereby possible to control the drive source in accordance with the travel plan, and low fuel travel becomes possible to thereby improve fuel efficiency.

(2) The drive source controller (vehicle control unit 1) is configured such that, when the selection of the "travel plan mode" is associated with the setting operation of the "eco-mode", the "eco-mode" is automatically set when the "travel plan mode" is selected. Accordingly, in addition to the effect of (1), a setting operation of the "eco-mode" by the driver becomes unnecessary, it is possible to reliably set the "eco-mode" when selecting the "travel plan mode" to control the drive source in accordance with the travel plan.

Second Embodiment

The second embodiment is an example in which a travel plan is set by giving consideration to driver characteristics, such as accelerator operation and brake operation of the driver.

Figure 5:
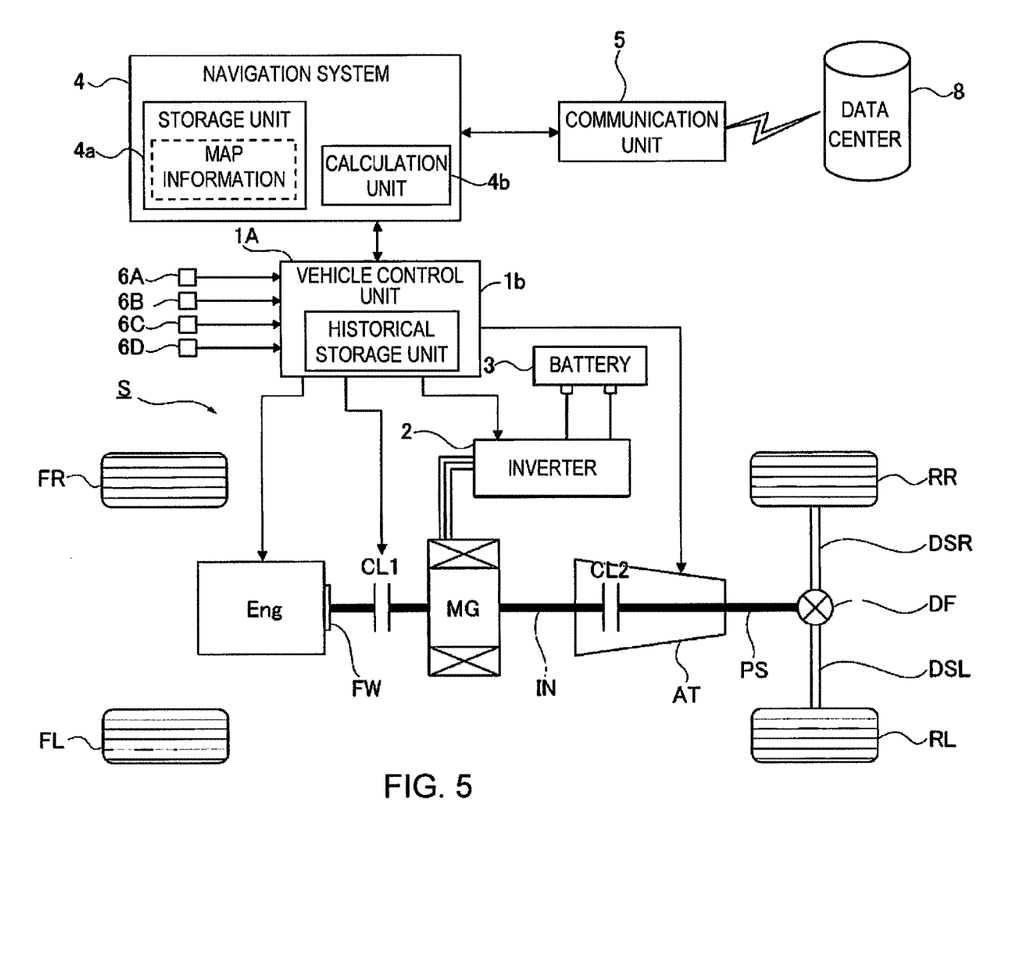
FIG. 5 is an overall system view illustrating a hybrid vehicle to which is applied the hybrid vehicle control device of a second embodiment.

FIG. 5 is an overall system view illustrating a hybrid vehicle to which is applied the hybrid vehicle control device of the second embodiment. The hybrid vehicle control device according to the second embodiment will be described below, based on FIG. 5. Configurations that are the same as the first embodiment are given the same reference symbols as the first embodiment, and detailed descriptions thereof are omitted.

The vehicle control unit 1A of the second embodiment comprises a historical storage unit 1b, as illustrated in FIG.

5. The historical storage unit 1b stores the history of driver characteristics, such as steering, accelerator operation, and brake operation of the driver.

Then, the vehicle control unit 1A calculates driver characteristic information based on the history of the driver characteristics that is input from the historical storage unit 1b and includes the driver characteristic information in the travel environment information when setting the travel plan on the planned travel route by the "travel plan mode" being selected. That is, the vehicle control unit sets the travel plan giving consideration to the driver characteristics.

Next, the actions of the second embodiment will be described. First, the "Travel plan setting action and problems thereof in the hybrid vehicle control device of the second comparative example" will be described, followed by a description of the travel plan setting action of the hybrid vehicle control device according to the second embodiment.

Figure 6:
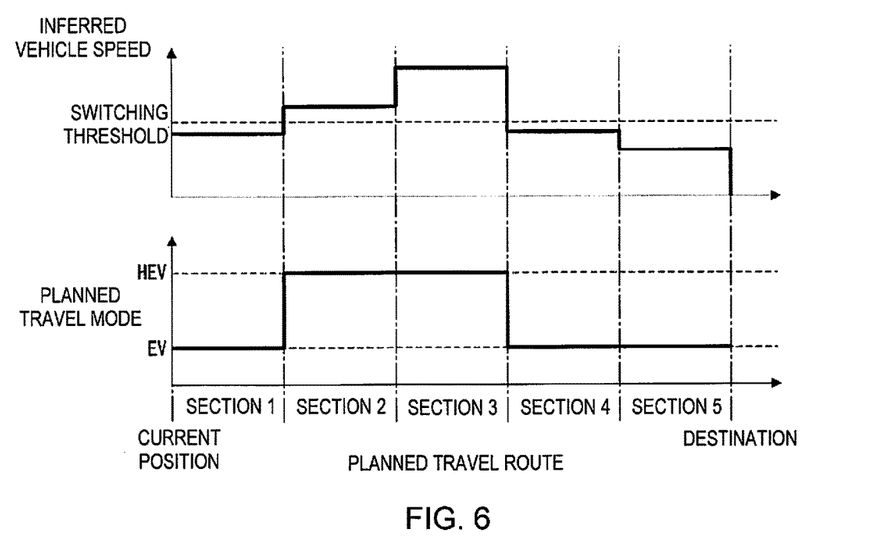
FIG. 6 is a time chart illustrating the characteristics of each of the inferred vehicle speed/planned travel mode, when setting the "travel plan mode" in the control device of a second comparative example.

FIG. 6 is a time chart illustrating the characteristics of each of the inferred vehicle speed/planned travel mode, when setting the "travel plan mode" in the control device of a second comparative example. The travel plan setting action and problems thereof in the hybrid vehicle control device of the second comparative example will be described below, based on FIG. 6.

In the hybrid vehicle control device according to the second comparative example, when the "travel plan mode" is selected as the driving mode, the driving mode that is already set from among the "eco-mode," "sports mode," and the "normal mode," is continued. In addition, the travel plan is set giving consideration to driver characteristic information that is calculated based on the history of the driver characteristics that are stored in the historical storage unit 1b.

That is, the planned travel route is divided into a plurality of sections (here, section 1-section 5), as illustrated in FIG. 6, and the travel environment information is acquired for each section to calculate the inferred vehicle speed. By including the driver characteristic information in the travel environment information acquired at this time, it is possible to give consideration to the driver characteristics when calculating the inferred vehicle speed. The planned travel route illustrated in FIG. 6 shall be the same route at the first embodiment, to be a route on which a low fuel travel is possible by setting the "EV mode" in section 1, section 2, and section 4, and setting the "HEV mode" in section 3 and section 5.

With respect to the foregoing, as a result of considering the driver characteristics, the inferred vehicle speed in the control device of the second comparative example becomes greater than or equal to the switching threshold in section 2 and section 3, and falls below the switching threshold in section 1, section 4, and section 5, as illustrated in FIG. 6. Accordingly, the planned travel mode (travel plan) becomes "EV mode" in section 1, section 4, and section 5, and becomes "HEV mode" in section 2 and section 3.

Here, in order to realize a low fuel travel, it is necessary to set the "EV mode" in section 2 and to set the "HEV mode" in section 5, as described above. However, in order to give consideration to the driver characteristics to prevent an unexpected engine start by a driver's operation and to appropriately respond to the driver's requested drive force at the same time, a problem occurs in which it is necessary to employ a travel plan with a relatively low fuel efficiency.

Travel Plan Setting Action

Figure 7:
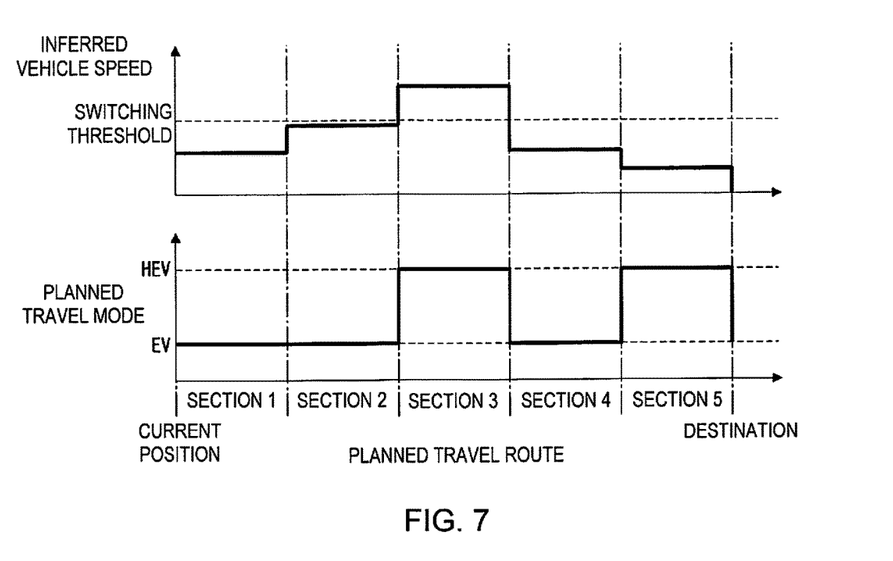
FIG. 7 is a time chart illustrating the characteristics of each of the inferred vehicle speed/planned travel mode, when setting the "travel plan mode" in the control device of the second embodiment.

FIG. 7 is a time chart illustrating the characteristics of each of the inferred vehicle speed/planned travel mode, when setting the "travel plan mode" in the control device of the second embodiment. The travel plan setting action in the control device of the second embodiment will be described below, based on FIG. 7.

In the hybrid vehicle control device of the second embodiment, if the planned travel route is set and the "travel plan mode" is selected as the driving mode, the "eco-mode" is automatically set. Then, when the "eco-mode" is set, the travel plan on the planned travel route is set based on the travel environment information. At this time, the travel plan is set giving consideration to the driver characteristics by including the driver characteristic information in the travel environment information, in the same manner as the second comparative example.

Here, in the second embodiment, the "eco-mode" is already set by selecting the "travel plan mode." Accordingly, it is possible to lower the inferred vehicle speed that is used when setting the travel plan, compared to the case of the second comparative example in which the "eco-mode" is not set. In other words, it is possible to change (raise) the switching threshold that determines the traveling mode. As a result, the inferred vehicle speed falls below the switching threshold in section 1, section 2, section 4, and section 5, and the inferred vehicle speed becomes greater than or equal to the switching threshold in section 3, as illustrated in FIG. 7.

It is thereby possible to set the planned travel mode to the "EV mode" which can realize a low fuel travel in section 2. On the other hand, regarding section 5, by allowing traveling in the "EV mode" in section 2, it is possible to put the battery SOC in a sufficiently consumed state at the timing of traveling section 5, and it is possible to set the planned travel mode to the "HEV mode" which can realize a low fuel travel. As a result, it is possible to correct the travel plan (travel plan of the second corn) that is set with consideration for the driver characteristics and to set a travel plan with which a low fuel travel can be realized, thereby improving the fuel efficiency.

That is, in the second embodiment, it is possible to improve the accuracy of the travel plan and to suppress an unexpected engine start by the driving of the driver while being able to set a travel plan that assumes the setting of the "eco-mode," by including the driver characteristic information in the travel environment information; therefore, it is possible to achieve a travel plan that is capable of low fuel travel.

The effects listed below can be obtained with the hybrid vehicle control device according to the second embodiment.

(3) The drive source controller (vehicle control unit 1) is configured to include driver characteristic information in the travel environment information that is used when setting the travel plan. Accordingly, in addition to the effect of (1) or (2), it is possible to improve the accuracy of the travel plan and to suppress an unexpected engine start by the driving of the driver, while achieving a travel plan that is capable of low fuel travel.

The hybrid vehicle control device of the present invention was described above based on the first embodiment and the second embodiment, but specific configurations thereof are not limited to these embodiments, and various modifications and additions to the design can be made without departing from the scope of the invention according to each claim.

In the first embodiment and the second embodiment, examples were shown in which the "eco-mode is automatically set when the "travel plan mode" is selected as the driving mode. However, since it is sufficient if the selection of the "travel plan mode" is associated with the setting operation of the "eco-mode," the configuration may be one in which, for example, if the "travel plan mode" is selected in Step S2, the process proceeds to Step S3A to induce the driver to set the "eco-mode," as illustrated by the flowchart in FIG. 8. In this case, the setting of the "eco-mode" itself is carried out by a manual operation by the driver.

Thus, if the driver sets the "eco-mode," the driver operation is suppressed, and it is possible to suppress an unexpected engine start caused by the driving of the driver, and to control the drive source in accordance with the travel plan for achieving a low fuel travel. In addition, since the setting of the "eco-mode" itself is carried out by a manual operation by the driver, it is possible to carry out a control that respects the intention of the driver.

Figure 8:
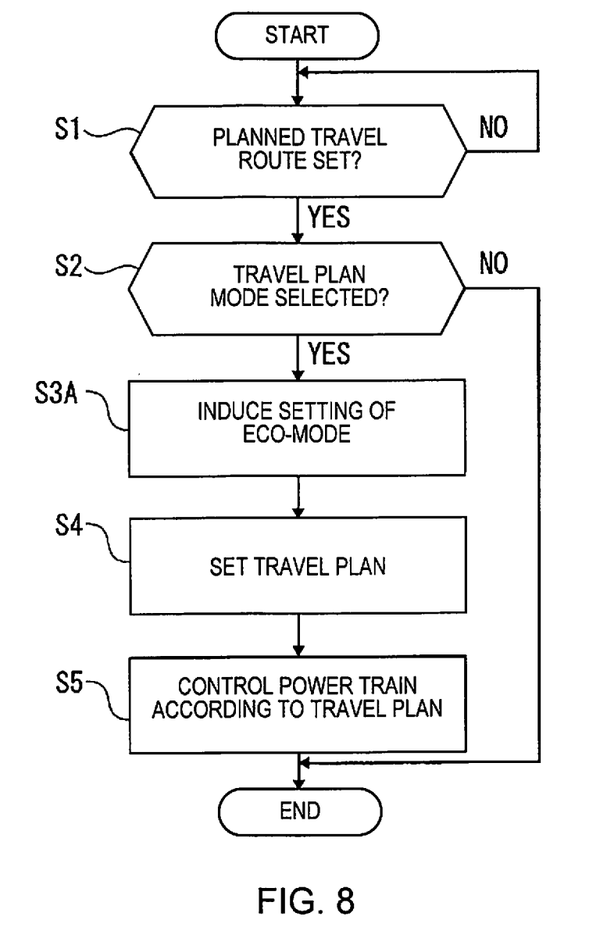
FIG. 8 is a flowchart illustrating the flow of a driving mode setting process that is executed by the vehicle control unit of another example of the present invention.

"Induce to set the 'eco-mode'" here means, for example, displaying a setting screen of the "eco-mode" on a display of the navigation system 4, which is not shown, or illuminating a setting button for the "eco-mode". In addition, the driver may be urged to set the "eco-mode" by voice as well.

In addition, in the first embodiment and the second embodiment, examples were shown in which the setting of the travel plan is carried out by setting a planned travel mode for each section after dividing the planned travel route into a plurality of sections, but the invention is not limited thereto. For example, a consumption management of the battery SOC may be planned, or a drive force distribution of the engine Eng and the motor/generator MG may be set in sections in which the planned travel mode is the "HEV mode".

Additionally, in the above-described embodiments, examples were shown in which a planned travel route is set, and when the "travel plan mode" is selected, the entire planned travel route that is set in advance is divided into a plurality of sections, after which a travel plan is set for each section, but the invention is not limited thereto. For example, one section ahead may be predicted with respect to the current position, and a travel plan may be set for each one section.

Furthermore, in the above-described embodiments, examples were shown in which the hybrid vehicle S is a FR hybrid vehicle; however, the hybrid vehicle may be a FF hybrid vehicle, or a series-type hybrid vehicle that travels by a motor and in which a generator is driven by an engine. The vehicle may be a plug-in hybrid vehicle. That is, the control device of the present invention may be applied to any hybrid vehicle comprising an engine and a motor.

The invention claimed is:

1. A hybrid vehicle control device configured to be mounted in a hybrid vehicle having a drive source that includes an engine and a motor, and a navigation system that acquires travel environment information on a planned travel route, and comprising:
   a drive source controller that carries out control of the drive source in accordance with a driving mode of the hybrid vehicle, the drive source controller being configured to selectively control the drive source to operate in one of an EV mode and an HEV mode as travel modes, wherein
   the hybrid vehicle comprises, as the driving modes,
      a travel plan mode that sets a travel plan to control the travel mode of the drive source for low fuel consumption travel based on the travel environment information and an assumed requested drive force of a driver, and
      an eco-mode that controls the drive source to prioritize fuel efficiency over power performance by decreasing a target drive force with respect to an accelerator operation amount,
      each of the travel plan mode and the eco-mode being manually selectable, and
   the drive source controller is configured to determine whether the planned travel route has been set by the navigation system and whether the travel plan mode has been selected in a state in which the eco-mode is not selected, and to automatically set the eco-mode in parallel with the travel plan mode when the drive source controller determines that the planned travel route has been set by the navigation system and that the travel plan mode has been selected in a state in which the eco-mode is not selected, the travel plan being set after the eco-mode is automatically set.

2. The hybrid vehicle control device according to claim 1, wherein
   the drive source controller includes driver characteristic information in the travel environment information that is used when setting the travel plan.

3. The hybrid vehicle control device according to claim 1, wherein
   the travel plan mode gives priority to an actual requested drive force of the driver when the actual requested drive force requires a travel mode that is different from the travel plan.

4. The hybrid vehicle control device according to claim 1, wherein
   in the travel plan mode, the planned travel route is divided into a plurality of sections and the travel mode in each of the sections is set according to the assumed requested drive force to configure the travel plan.

5. A hybrid vehicle control device configured to be mounted in a hybrid vehicle having a drive source that includes an engine and a motor, and a navigation system that acquires travel environment information on a planned travel route, and comprising:
   a drive source controller that carries out control of the drive source in accordance with a driving mode of the hybrid vehicle, the drive source controller being configured to selectively control the drive source to operate in one of an EV mode and an HEV mode as travel modes, wherein
   the hybrid vehicle comprises, as the driving modes,
      a travel plan mode that sets a travel plan to control the travel mode of the drive source for low fuel consumption travel based on the travel environment information and an assumed requested drive force of a driver, and
      an eco-mode that controls the drive source to prioritize fuel efficiency over power performance by decreasing a target drive force with respect to an accelerator operation amount,
      each of the travel plan mode and the eco-mode being manually selectable, and
   the drive source controller is configured to determine whether the planned travel route has been set by the navigation system and whether the travel plan mode has been selected in a state in which the eco-mode is not selected, and to recommend setting the eco-mode when the drive source controller determines that the planned travel route has been set by the navigation system and that the travel plan mode has been selected in a state in which the eco-mode is not selected, the travel plan being set after setting the eco-mode is recommended.

6. The hybrid vehicle control device according to claim 5, wherein the drive source controller includes driver characteristic information in the travel environment information that is used when setting the travel plan.

7. The hybrid vehicle control device according to claim 5, wherein the travel plan mode gives priority to an actual requested drive force of the driver when the actual requested drive force requires a travel mode that is different from the travel plan.

8. The hybrid vehicle control device according to claim 5, wherein in the travel plan mode, the planned travel route is divided into a plurality of sections and the travel mode in each of the sections is set according to the assumed requested drive force to configure the travel plan.

9. The hybrid vehicle control device according to claim 5, wherein the travel plan mode and the eco-mode are set in parallel when the eco-mode is selected in response to the recommendation.

\* \* \* \* \*